3,056,695
PROCESS FOR THE TREATMENT OF TEXTILE
MATERIALS
Hanswilli von Brachel, Koln-Sulz, Otto Bayer, Leverkusen-Bayerwerk, Georg von Finck, Leverkusen-Schlebusch, and Werner Langmann, Koln-Mulheim, Germany, assignors to Farbenfabriken Bayer Aktiengesellschaft, Leverkusen, Germany, a corporation of Germany
No Drawing. Filed July 13, 1960, Ser. No. 42,502
Claims priority, application Germany Aug. 4, 1959
6 Claims. (Cl. 117—139.5)

The present invention relates to a process for the treatment of textile materials; more particularly it concerns a process wherein addition compounds of hydroxyl group-containing polyalkylene ethers and esters or amides of acrylic acid or methacrylic acid deriving from at least bifunctional alcohols, amino-alcohols or amines which contain at least two free acrylic acid or methacrylic acid radicals in the molecule are crosslinked on the textile materials.

The addition compounds to be used in the process of the invention correspond to the general formula

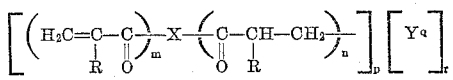

In this formula R stands for hydrogen or methyl, X for the radical of a polyfunctional alcohol, aminoalcohol or amine of a valency equal to or greater than $m+n$, and Y for the radical of a polyalkylene ether containing $q$ hydroxyl groups whereby the symbols R, X and Y in one and the same molecule may also be different radicals in accordance with their significance.

The letters $m$, $n$, $p$, $q$ and $r$ stand for numbers; instead of definite whole numbers, each of these letters in one and the same addition compound may also denote several numbers, the sum of the products from the figure values of $m$ and the corresponding figure values of $p$ being at least 2 and the sum of the products from the figure values of $n$ and the corresponding figure values of $p$ being equal to the sum of the products from the figure values of $r$ and the corresponding figure values of $q$.

As esters or amides of acrylic acid or methacrylic acid on which the addition compounds to be used according to the invention may be based, there may be mentioned for example the diacrylates and dimethacrylates or polyacrylates and polymethacrylates of butane diol-1,3, butene-diol-1,4, hexane diol-1,4, octadecane diol-1,12, glycerol, trimethylolpropane, pentaerythritol and sorbitol or the diacryl- and dimethacryl- or polyacryl- and polymethacryl amides of ethylene diamine, hexamethylene diamine, diethylene-triamine, d - (γ - aminopropyl)-methylamine, γ,γ'-diamino-dipropyl ether, dipropylene triamine and polyethylene imine. Especially noteworthy are methylene-bis-acrylamide, triacrylyl-hexa-hydro-triazine as well as the acyl-diacrylyl-hexahydro-triazines such as can be obtained according to German patent specification No. 859,170 from acrylonitrile or methacrylonitrile with formaldehyde, if desired with the addition of saturated nitriles.

Examples of hydroxyl-group containing polyalkylene ethers on which the addition compounds to be used according to the invention may be based are polyethylene-glycol, polypropylene-glycol, co-polymerisates from ethylene and propylene oxide as well as a great number of ether group-containing hydroxyalkylation products obtainable by the reaction of mono- or polyhydric alcohols, phenols, carboxylic acids, carboxylic acid amides, mercaptans, primary and secondary amines, sulphonamides, hydroxycarboxylic acids, aminocarboxylic acids and ammonia with alkylene oxides, for example ethylene oxide or propylene oxide.

The addition of the hydroxyl group-containing polyalkylene ethers to the esters or amides of acrylic acid or methacrylic acid may have been effected in various ways, for example by stirring the components at temperatures of 20–100° C. for several hours in the presence of alkali metal hydroxide, alkali metal alcoholates or quaternary bases. The hydroxyl group-containing polyalkylene ethers and the acrylic acid or methacrylic acid esters or amides are used in such a proportion that more than one carbon-carbon double bond of acrylic acid or methacrylic acid ester or amide is present per hydroxyl group of the polyalkylene ether.

For carrying out the process of the invention addition compounds are preferably used which are water-soluble or at least emulsifiable in water and contain amide groups.

The cross-linking of the addition compounds on the textile materials can be carried out by polymerising on the textile materials the addition compounds which, thanks to the still free acrylic acid or methacrylic acid radicals present are polymerisable, if desired in the presence of a small quantity of an inorganic or organic peroxide. With addition compounds having a high content of acrylic acid or methacrylic acid radicals or with addition compounds for the production of which stabilising agents have been used only to a small extent or not at all, an addition of peroxides is, in general, unnecessary, since the ether peroxides formed during the air-drying of the textile materials treated with the addition compounds, already start the polymerisation.

It has proved to be especially advantageous to effect the cross-linking of the addition compounds on the textile materials with the aid of compounds containing at least two active hydrogen atoms and capable of adding on to the double bond of the available free acrylic acid or methacrylic acid radicals. Suitable compounds are for example ammonia, amines such as ethylene diamine, diethylene triamine, triethylene tetramine and the higher polyethylene imines, propylene diamine-1,2 and -1,3, dipropylene triamine and the higher polypropylene imines, hexamethylene diamine, ω,ω-diaminoxylol, piperazine, 1,3-diamino-cyclohexane, 1,7 - diamino - 4 - oxaheptane, 1,9 - diamino-5-oxanonane, trimethylene-propane-tris-(γ-aminopropyl) ether, hydroxyethylethylene diamine, 1-diamino-4-thiaheptane and di-N,N'-β-aminoethyl-adipic acid diamide, further polyalcohols such as trimethylol propane, glycerol, sorbitol, saccharose, polyglycerol and dextrins, as well as the hydroxyalkylation products of these amines and polyalcohols. Hydrogen sulphide and polymercaptans are likewise suitable. Furthermore there may be mentioned the derivatives of amino alcohols and mercaptans containing at least two active hydrogen atoms such as the reaction product from 1 mol of diethylene triamine and 1 mol of stearoyl chloride or 1 mol of stearyl isocyanate as well as fatty acid esters of sugars. Instead of ammonia or amines, there may also be used compounds liberating ammonia or amines upon heating such as the ammonium or amine salts of volatile acids or urotropine. When using polyalcohols a basic catalyst such as alkali metal hydroxide or tetraalkyl-ammonium hydroxide is required. The compounds which are intended to give rise to the cross-linking are expediently used in a quantity such that about one active hydrogen atom is present per double bond of acrylic or methacrylic acid ester or amide.

The process according to the invention is, in general, carried out by impregnating the textile materials to be treated with aqueous solutions or emulsions which contain the proposed addition compounds and, if necessary, the required catalysts or cross-linking compounds, and heating them subsequently.

A mode of operation of the present invention consists in producing the addition compounds to be cross-linked on the textile materials on the textile materials themselves by treating the textile materials with the hydroxyl group-containing polyalkylene ethers and the esters or amides of acrylic acid or methacrylic acid concerned, expediently in the presence of a catalyst accelerating the addition and, if desired, in the presence of a compound giving rise to the cross-linking and containing at least two active hydrogen atoms. The addition of such a compound can be dispensed with if polyalkylene ethers containing hydroxyl groups and at least two active hydrogen atoms are used in a quantity such that about 1 hydrogen atom is present per double bond of free acrylic acid or methacrylic acid radicals.

The textile materials treated according to the process of the invention possess valuable properties; in the first place they have an excellent antistatic finish. The antistatic finish is preserved even after storage for several months; it is also fast to frequent washing with soap or synthetic detergents in an aqueous liquor and stands repeated dry cleaning with organic solvents without undergoing changes. If desired, the treatment of textiles according to the invention may be combined with the use of conventional agent usefully influencing the textiles, for example plasticisers or brightening agents. Furthermore, pigments may also be added to the finish of the textile materials which are then bonded fast to washing by the cross-linked addition compounds. The hydroxyl group-containing polyalkylene ethers or the cross-linking compounds themselves may also contain groups, for example quaternary ammonium groups or tertiary sulphonium groups, which increase the water-solubility of the addition compounds or the antistatic effect of the treated textile materials, or which improve the feel of the treated textile materials such as higher alkyl radicals.

The following examples serve to illustrate the invention without, however, limiting the scope thereof.

Example 1

A fabric of polyacrylonitrile, nylon, polycaprolactam or polyethylene-terephthalate is impregnated on the foulard with an aqueous solution containing per litre 10 g. of the addition product described below and 25 g. of ammonia, then dried and heated to 120° C. for 10 minutes. The fabric thus treated has an excellent antistatic finish, even after repeated washing.

The addition product used is prepared as follows: 50 g. of triacrylyl-hexahydrotriazine are dissolved in 150 cc. of pyridine with the addition of 1 g. of hydroquinone at 80° C. and treated with 200 g. of polyethylene oxide of molecular weight 2300 previously heated in a vacuum at 180° C. for 1 hour. The mixture is then treated at 80° C. with a solution prepared from 80 g. of polyethylene oxide containing 1% of sodium alcoholate, and 80 cc. of pyridine, and then kept in a nitrogen atmosphere at 80° C. for 4 hours. The pyridine is then distilled off in a vacuum and on a water bath.

Example 2

A fabric of polyacrylonitrile, wool, secondary acetyl cellulose or regenerated cellulose, polyamide or polyethylene terephthalate is treated on the foulard with an aqueous solution containing per litre 20 g. of the addition product described below and 3 g. of diethylene triamine or pentaethylene hexamine, then dried and heated to 140° C. for 20 minutes. The fabric possesses a pleasant feel and its antistatic finish is not reduced, even by repeated washing with soap, synthetic detergents or organic solvents such as benzine or carbon tetrachloride.

The addition product used is prepared according to the instructions given in Example 1 by reacting 250 g. of triacrylyl-hexahydrotriazine dissolved in 1100 cc. of pyridine, with 1400 g. of hydroxyethylated octadecane diol-(1,12) of molecular weight 2200 with the addition of 1 g. of hydroquinone and 1 g. of sodium.

Example 3

A fabric of polyacrylonitrile, polyamide, polyethylene terephthalate or acetyl cellulose is treated on the foulard with an aqueous liquor containing per litre 20 g. of the addition product described below, 10 g. of ammonia and 12 g. of 30% hydrogen peroxide, then dried and heated to 140° C. for 10 minutes. The antistatic effect obtained on the fabric is very fast to washing.

The addition product used is prepared by reacting 100 g. of triacrylyl-hexahydrotriazine in 230 cc. of dimethylformamide with the addition of 1 g. of hydroquinone and 0.2 g. of sodium methylate with 560 g. of a co-polymerisate from 15% of propylene oxide and 85% of ethylene oxide of molecular weight 2100.

Example 4

A fabric of polyacrylonitrile is treated on the foulard with a liquor containing per litre 20 g. of the addition product described below, 3 g. of acetic acid diethylene triamine and 5 g. of finely divided soot, the soot being dispersed with 0.5 g. of the reaction product from 20 mols of ethylene oxide and 1 mol of oleyl alcohol, then dried and heated to 140° C. for 10 minutes. The fabric thus obtains a grey dyeing which is fast to washing and exhibits a good antistatic finish.

The addition product used is prepared according to the instructions of Example 1 from 50 g. of triacrylyl-hexahydrotriazine and 140 g. of hydroxyethylated N,N-dimethylpropylene diamine-(1,3) of molecular weight 1200.

We claim:

1. Process for treating a textile material which comprises applying to the textile material a compound of the formula

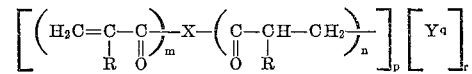

wherein R stands for a member selected from the group consisting of hydrogen and methyl; X stands for a radical selected from the group consisting of polyfunctional alcohol, amino alcohol and amine, the valency of said radical being at least equal to $m+n$; Y stands for the radical of a polyalkylene ether containing $q$ hydroxyl groups; and $m$, $n$, $p$, $q$, and $r$ stand for numbers which may vary within the same addition compound; the sum of the products from the figure values of $m$ and the corresponding figure values of $p$ being at least 2 and the sum of the products from the figure values of $n$ and the corresponding figure values of $p$ being equal to the sum of the products from the figure values of $r$ and the corresponding figure values of $q$; and heating the textile materials to a temperature sufficient to secure polymerization of the compounds applied.

2. Process according to claim 1 wherein X in the general formula is the radical of hexahydrotriazine.

3. Process according to claim 1 wherein the heating step is performed in the presence of a peroxide.

4. Process according to claim 1 wherein the heating step is performed in the presence of a compound containing at least two active hydrogen atoms and capable of adding on to the double bond of acrylic acid radicals.

5. Process according to claim 1 wherein the heating step is performed in the presence of an amine containing at least two active hydrogen atoms and capable of adding on to the double bond of acrylic acid radicals.

6. Process according to claim 1 wherein the heating step is carried out subsequent to the application of the compounds to the textile material.

References Cited in the file of this patent

UNITED STATES PATENTS

| | | |
|---|---|---|
| 2,615,882 | Zerner et al. | Oct. 28, 1952 |
| 2,615,887 | Zerner et al. | Oct. 28, 1952 |
| 2,767,107 | Young et al. | Oct. 6, 1956 |
| 2,831,833 | Aycock et al. | Apr. 22, 1958 |
| 3,016,281 | Kropa et al. | Jan. 9, 1962 |